United States Patent
Wong

(10) Patent No.: US 9,285,817 B2
(45) Date of Patent: Mar. 15, 2016

(54) POWER SUPPLY DEVICE FOR A NONLINEAR, TIME-VARYING LOAD

(75) Inventor: Kwok Tung Wong, Puschendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 287 days.

(21) Appl. No.: 13/880,712

(22) PCT Filed: Oct. 18, 2011

(86) PCT No.: PCT/EP2011/068166
§ 371 (c)(1),
(2), (4) Date: Apr. 19, 2013

(87) PCT Pub. No.: WO2012/052424
PCT Pub. Date: Apr. 26, 2012

(65) Prior Publication Data
US 2013/0207623 A1    Aug. 15, 2013

(30) Foreign Application Priority Data
Oct. 19, 2010 (EP) ..................... 10187992

(51) Int. Cl.
*G05F 1/70* (2006.01)
*H02J 3/18* (2006.01)
(Continued)

(52) U.S. Cl.
CPC ................. *G05F 1/70* (2013.01); *H02J 3/1857* (2013.01); *H02M 1/12* (2013.01); *H02M 1/143* (2013.01); *Y02E 40/26* (2013.01)

(58) Field of Classification Search
CPC ......... H02M 1/12; H02M 1/14; H02M 1/143; G05F 1/70
USPC ......... 323/205, 206, 207, 208, 209, 210, 211; 363/39, 40, 41, 42, 43, 44, 45, 46, 47, 363/48
See application file for complete search history.

(56) References Cited

U.S. PATENT DOCUMENTS

| 5,091,839 | A | * | 2/1992 | Gaul | ......................... H02J 3/26 307/45 |
| 5,343,079 | A | * | 8/1994 | Mohan et al. | ................. 307/105 |

(Continued)

FOREIGN PATENT DOCUMENTS

| DE | 102008049610 A1 | 4/2010 | ................ G05F 1/70 |
| EP | 0847612 B1 | 4/2001 | ................ H02J 3/01 |

(Continued)

OTHER PUBLICATIONS

Peng, Fang Z. et al., "A Universal STATCOM with Delta-Connected Cascade Multilevel Inverter," 35th Annual IEEE Power Electronics Specialists Conference, 5 pages, Jun. 2004.
(Continued)

*Primary Examiner* — Jue Zhang
*Assistant Examiner* — Lakaisha Jackson
(74) *Attorney, Agent, or Firm* — Slayden Grubert Beard PLLC

(57) ABSTRACT

A power supply device for a nonlinear, time-varying load has a multi-phase power system. The load and a reactive power compensator are connected to the phases of the power system. The reactive power compensator is embodied as a multilevel converter with multiple strands, each connected to one of the power system phases and to the other strands at a common star point. The power supply device has a filter circuit that filters harmonics of load and converter currents. The filter circuit has multiple strands, each connected to one of the power system phases and to the other strands at a common star point of the filter circuit, which is connected to the common star point of the multilevel converter such that the common star point of the multilevel converter is connected to the power system phases both via the strands of the multilevel converter and via the filter circuit.

10 Claims, 2 Drawing Sheets

(51) Int. Cl.
*H02M 1/14* (2006.01)
*H02M 1/12* (2006.01)

(56) References Cited

U.S. PATENT DOCUMENTS

| | | | | |
|---|---|---|---|---|
| 5,491,624 | A | * 2/1996 | Levran | H03K 17/08148 |
| | | | | 363/44 |
| 5,568,371 | A | * 10/1996 | Pitel | H02J 3/01 |
| | | | | 361/113 |
| 6,075,350 | A | 6/2000 | Peng | 323/207 |
| 6,466,466 | B1 | * 10/2002 | Karlsson et al. | 363/44 |
| 2011/0176575 | A1 | 7/2011 | Hörger et al. | 373/104 |
| 2011/0260701 | A1 | 10/2011 | Hörger et al. | 323/207 |
| 2013/0063989 | A1 | * 3/2013 | Jiang-Hafner | H01H 33/596 |
| | | | | 363/52 |
| 2014/0084877 | A1 | * 3/2014 | Hasler | H02J 3/1821 |
| | | | | 323/209 |

FOREIGN PATENT DOCUMENTS

| | | | |
|---|---|---|---|
| EP | 2202863 A1 | 6/2010 | H02J 3/18 |
| RU | 2353046 C1 | 4/2009 | H02M 1/10 |
| SU | 1718328 A1 | 3/1992 | H02J 3/18 |
| WO | 2010/115471 A1 | 10/2010 | H02J 3/18 |
| WO | 2012/052424 A1 | 4/2012 | H02J 3/18 |

OTHER PUBLICATIONS

European Search Report, Application No. 10187992.2, 5 pages, Aug. 2, 2011.

International Search Report and Written Opinion, Application No. PCT/EP2011/068166, 16 pages, Dec. 16, 2011.

European Office Action, Application No. 11773713.0, 4 pages, May 20, 2015.

* cited by examiner

POWER SUPPLY DEVICE FOR A NONLINEAR, TIME-VARYING LOAD

CROSS-REFERENCE TO RELATED APPLICATIONS

This application is a U.S. National Stage Application of International Application No. PCT/EP2011/068166 filed Oct. 18, 2011, which designates the United States of America, and claims priority to EP Patent Application No. 10187992.2 filed Oct. 19, 2010 The contents of which are hereby incorporated by reference in their entirety.

TECHNICAL FIELD

The present disclosure relates to a power supply device for a nonlinear load that varies with time, for example,
 wherein the power supply device has a power system having a plurality of phases,
 wherein the nonlinear, time-varying load and a reactive power compensator are connected to the phases of the power system,
 wherein the reactive power compensator is embodied as a multilevel converter having a plurality of strands, and
 wherein the strands of the multilevel converter are connected on the one hand to one of the phases of the power system in each case and on the other hand to one another at a common star point.

BACKGROUND

Nonlinear, time-varying loads such as, for instance, three-phase arc furnaces can give rise to considerable disturbances that affect the power supply system, in particular what termed flicker. For this reason power supply installations for nonlinear loads varying with time generally include a reactive power compensator. The reactive power compensator is connected in parallel with the nonlinear, time-varying load. In the simplest case the reactive power compensator can be embodied as what is termed a TCR (thyristor-controlled reactor), see EP 0 847 612 B1, for example.

A power supply device of the kind cited in the introduction is known for example from DE 10 2008 049 610 A1 and EP 2 202 863 A1.

While it is expressly mentioned in the prior art that the multilevel converter can be connected to the phases of the power system alternatively in a star or delta configuration, the multilevel converter is, though, in practice always connected to the phases of the power system in a delta configuration. The reason for this is that the multilevel converter must be able at a certain instant to absorb energy via one of its strands and at the same time deliver energy via another of its strands. This—in the case both of a delta and of a star connection—can very quickly cause permissible voltage limits to be exceeded, resulting in blocking of the multilevel converter.

When the multilevel converter is connected in a delta configuration it is, however, known to maintain the voltage limits by generating within the circuit formed by the strands of the multilevel converter a corresponding current flow by means of which developing voltages will be kept within the permissible range. A zero sequence current flow of such kind is not readily possible in the case of a star connection.

It is furthermore known to provide within the multilevel converter an alternating-current (AC) voltage circuit which is operated on a high-frequency basis and which connects the individual direct-current (DC) voltage circuits of all the modules of all the strands of the multilevel converter to one another. In this embodiment the exchange of energy takes place by way of a DC-to-AC voltage conversion alongside downstream AC-to-DC voltage conversion. This embodiment of the multilevel converter can be used both in a delta connection and in a star connection. In this case, however, the embodiment of the multilevel converter is very complex. Moreover, the possible energy transfer per unit of time is relatively low.

SUMMARY

One embodiment provides a power supply device for a nonlinear, time-varying load, wherein the power supply device has a power system having a plurality of phases, wherein the nonlinear, time-varying load and a reactive power compensator are connected to the phases of the power system, wherein the reactive power compensator is embodied as a multilevel converter having a plurality of strands, wherein the strands of the multilevel converter are connected on the one hand to one of the phases of the power system in each case and on the other hand to one another at a common star point, wherein the common star point of the multilevel converter is connected to a star point of a further device connected to the phases of the power system such that the common star point of the multilevel converter is connected to the phases of the power system both via the strands of the multilevel converter and via the further device, and wherein the connection via the further device is embodied in such a way that there is a low-resistance connection of the common star point of the multilevel converter to the phases of the power system with respect to the power zero sequence system of the power system and a high-resistance connection with respect to the power positive sequence system of the power system and to the power negative sequence system of the power system.

In a further embodiment, the further device is embodied as a zigzag winding.

In a further embodiment, the power supply device has a power transformer via which the phases of the power system can be supplied with electric energy and in that the zigzag winding is installed as a secondary winding in the power transformer.

In a further embodiment, the power supply device has a power transformer via which the phases of the power system can be supplied with electric energy and in that the zigzag winding is embodied as a zigzag transformer that is different from the power transformer.

In a further embodiment, at least one of the star points of the power transformer and of the zigzag transformer is not grounded.

In a further embodiment, the power supply device has a filter circuit via which harmonics of load and converter currents can be filtered and in that the filter circuit has a plurality of strands which are connected on the one hand to one of the phases of the power system in each case and on the other hand to one another at a common star point of the filter circuit.

In a further embodiment, the power supply device has a filter circuit via which harmonics of load and converter currents can be filtered, in that the filter circuit has a plurality of strands which are connected on the one hand to one of the phases of the power system in each case and on the other hand to one another at a common star point of the filter circuit, and in that the further device is identical to the filter circuit.

In a further embodiment, a choke is disposed between the common star point of the filter circuit and the common star point of the multilevel converter.

In a further embodiment, the choke is dimensioned such that the combined impedance of choke and filter circuit is zero.

In a further embodiment, the power supply device has at least one further filter circuit via which harmonics of load and converter currents can be filtered.

In a further embodiment, the number of phases of the power system is three.

BRIEF DESCRIPTION OF THE DRAWINGS

Exemplary embodiments will be explained in more detail below based on the schematic drawings, wherein.

DETAILED DESCRIPTION

Embodiments of the present disclosure provide a power supply device in which the multilevel converter can be operated reliably in a simple manner.

Some embodiments provide a power supply device in which:
the common star point of the multilevel converter is connected to a star point of a further device connected to the phases of the power system such that the common star point of the multilevel converter is connected to the phases of the power system both via the strands of the multilevel converter and via the further device, and
the connection via the further device is embodied in such a way that there is a low-resistance connection of the common star point of the multilevel converter to the phases of the power system with respect to the power zero sequence system of the power system and a high-resistance connection with respect to the power positive sequence system of the power system and the power negative sequence system of the power system.

In a first embodiment of the power supply device the further device is embodied as a zigzag winding.

As a rule the power supply device has a power transformer via which the phases of the power system can be supplied with electric energy. In this case the zigzag winding can alternatively be installed as a secondary winding in the power transformer or can be embodied as a zigzag transformer that is different from the power transformer. The first-cited embodiment will be advantageous particularly when the power supply device is newly produced. The last-cited embodiment can also be realized when an existing power supply device is to be refashioned into the disclosed power supply device.

If the zigzag winding is embodied as a zigzag transformer that is different from the power transformer, e.g., at least one of the star points of the power transformer and of the zigzag transformer will not be grounded.

As a rule the power supply device has a filter circuit via which harmonics of load and converter currents can be filtered. In this case the filter circuit has a plurality of strands which are connected on the one hand to one of the phases of the power system in each case and on the other hand to one another at a common star point of the filter circuit.

It is possible for the further device to be identical to the filter circuit. In this case a zigzag winding will not be required.

If the filter circuit is used as the further device then a choke may be disposed between the common star point of the filter circuit and the common star point of the multilevel converter. The choke can be dimensioned in particular such that the combined impedance of choke and filter circuit is zero.

In addition to the above-cited filter circuit the power supply device usually has at least one further filter circuit via which harmonics of the load and converter currents can likewise be filtered.

The number of phases of the power system can be determined as required. Typically there are three phases present.

Figure 1:
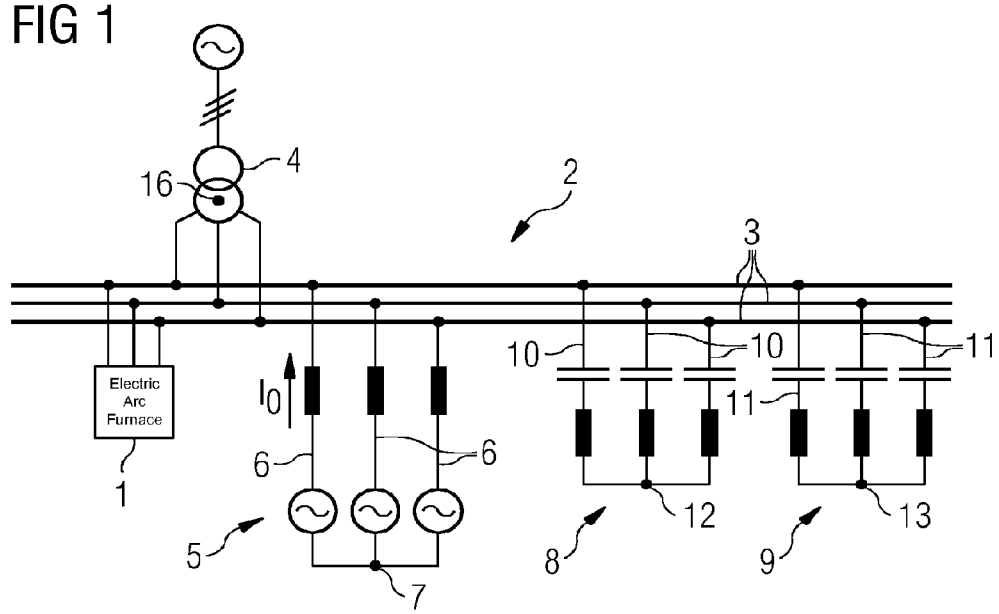
FIG. 1 shows the basic structure of a power supply device for a nonlinear load that varies with time.

According to FIG. 1, a nonlinear load 1 that varies with time is embodied—purely by way of example—as an electric arc furnace. The electric arc furnace 1 is supplied with electric energy via a power system 2. The power system 2 has a plurality of phases 3. The electric arc furnace 1 is connected to the phases 3 of the power system 2. The number of phases 3 can be determined as required. Typically, and as shown in FIG. 1, there are three phases 3 present.

The voltage applied to the electric arc furnace 1 is as a rule relatively low. It is typically in a range between several hundred volts and two kilovolts. The voltage of the power system 2 is by contrast much higher as a rule. It is usually within or just above the double-digit kilovolt range. Typical voltages of the power system 2 are 11 kilovolts, 30 kilovolts and 110 kilovolts. A furnace transformer is therefore disposed between the electric arc furnace 1 and the phases 3 of the power system 2. The furnace transformer is, though, only of secondary significance within the scope of the present disclosure and so is not shown in FIG. 1.

The power system 2 can be an external power system of considerable size. Alternatively it can be an internal power system belonging to the operator of the electric arc furnace 1. If it is an internal power system it can be an autonomous one. Alternatively the power supply device can have a power transformer 4 via which the phases 3 of the power system 2 can be supplied with electric energy from an external power supply system. The external power supply system can have a relatively high voltage of, for example, 110 kilovolts or 380 kilovolts.

A reactive power compensator 5 is furthermore connected to the phases 3 of the power system 2. The reactive power compensator 5 is embodied as a multilevel converter having a plurality of strands 6. According to FIG. 1, the strands 6 of the multilevel converter 5 are connected on the one hand to one of the phases 3 of the power system 2 in each case and on the other hand to one another at a common star point 7.

Multilevel converters 5 are generally known per se. Each strand 6 thereof includes a multistage serial circuit of modules, each module including a storage capacitor and self-commutated semiconductor switches. The term "self-commutated" means that the semiconductor switches can be both engaged and disengaged by externally supplied control signals. For example the self-commutated semiconductor switches can be embodied as IGBTs or as GTO thyristors. The term "self-commutated" hence contrasts with the term "line-commutated". The latter means that while the respective switching element can be selectively engaged it cannot be disengaged by an external control signal. An example of a line-commutated semiconductor switching element is a "standard" thyristor.

The semiconductor switches of each module can be switched independently of the semiconductor switches of the other modules belonging to the same strand 6 and to the other strands 6. The respective storage capacitor of the respective module is alternatively bridged or active depending on the respective switching status of the semiconductor switches of the corresponding module. Details of the structure, mode of functioning and operation of the multilevel converter 5 can be found for example in U.S. Pat. No. 6,075,350 A and EP 2 202 863 A1.

Furthermore the power supply device usually has at least one filter circuit 8, 9. Two such filter circuits 8, 9 are shown in FIG. 1. Harmonics of load and converter currents can be filtered via each filter circuit 8, 9. The harmonics are produced when the electric arc furnace 1 is operating.

Each filter circuit 8, 9 is configured for a specific filter frequency. Each filter circuit 8, 9 has a plurality of strands 10, 11. Each strand 10, 11 of the respective filter circuit 8, 9 is connected on the one hand to one of the phases 3 of the power system 2 in each case; the strands 10, 11 of the respective filter circuit 8, 9 are furthermore connected to each other at a respective common star point 12, 13 of the respective filter circuit 8, 9.

A respective filtering capacity requiring to be compensated is associated with the filter circuits 8, 9. The filtering capacities of the filter circuits 8, 9 are as a rule different from each other. The filter circuits 8, 9 are configured for the filtering capacity respectively requiring to be compensated.

The individual strands 6 of the multilevel converter 5 must be able to accept and deliver currents. The currents flowing in the individual strands 6 of the multilevel converter 5 are as a rule different from each other. In contrast to a delta configuration of the strands 6 in which the strands 6 of the multilevel converter 5 are connected to two of the phases 3 of the power system 2 in each case, a circulating current inside the multilevel converter 5 is not possible or at least not readily possible. Example embodiments of the power supply device shown in FIG. 1 are explained below in connection with FIGS. 2 to 4, in the case of which embodiments the zero current—identified by $I_0$ in FIGS. 2 to 4—can been realized differently.

Figure 2:
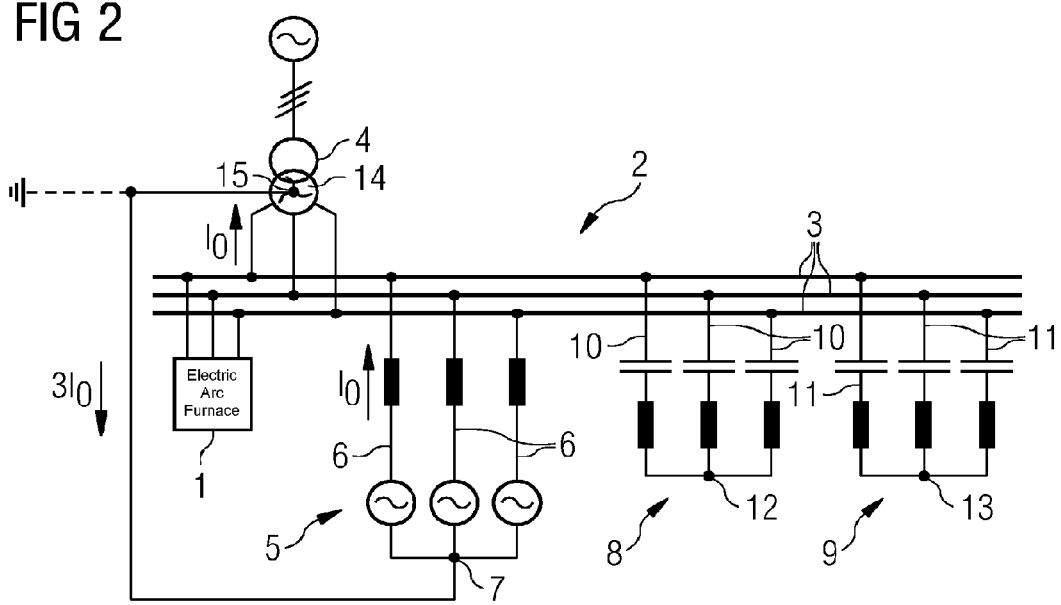
FIG. 2 shows an example embodiment of the power supply device of FIG. 1.
Figure 3:
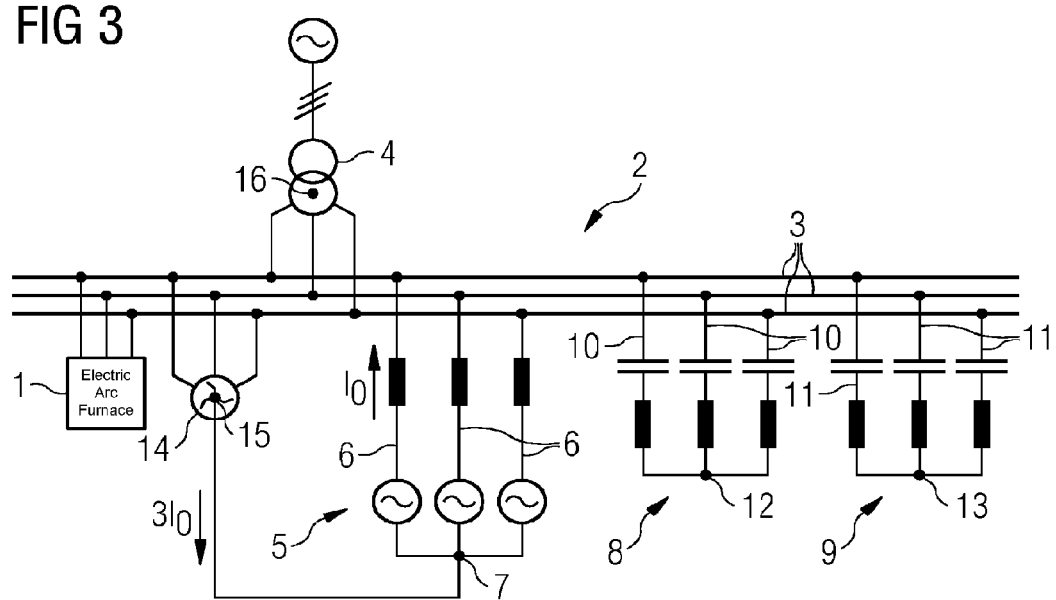
FIG. 3 shows another example embodiment of the power supply device of FIG. 1.

According to FIGS. 2 and 3, a zigzag winding 14 is present. The zigzag winding 14 is connected to the phases 3 of the power system 2. In the case of the embodiment according to FIG. 2, the zigzag winding 14 is installed in the power transformer 4 as a secondary winding. It therefore assumes the secondary winding's "standard" function of feeding the phases 3 of the power system 2 from the external power supply system. In the case of the embodiment according to FIG. 3, the zigzag winding 14 is embodied as being a zigzag transformer that is different from the power transformer 4.

In the case of the embodiments shown in FIGS. 2 and 3, the common star point 7 of the multilevel converter 5 is connected to a star point 15 of the zigzag winding 14. The common star point 7 of the multilevel converter 5 is thereby connected to the phases 3 of the power system 2 both via the strands 6 of the multilevel converter 5 and via the zigzag winding 14. The connection via the zigzag winding 14 is (owing to the typical characteristics of zigzag windings inherent in their design) such that—referred to the connection via the zigzag winding 14—there is a low-resistance connection of the common star point 7 of the multilevel converter 5 to the phases 3 of the power system 2 with respect to the power zero sequence system of the power system 2. However, with respect to the power positive sequence system of the power system 2 and to the power negative sequence system of the power system 2—referred to the connection via the zigzag winding 14—there is only a high-resistance connection of the common star point 7 of the multilevel converter 5 to the phases 3 of the power system 2.

The terms "power zero sequence system", "power positive sequence system" and "power negative sequence system" in connection with three-phase systems will be familiar to any person skilled in the art. Their significance in the case of a three-phase power system is as follows:

The power positive sequence system has three vectors with the same amplitude that are referred to below as A, B and C. The three vectors A, B, C have a 120° phase offset in electrical terms relative to each other. Vectors A, B, C rotate in the same direction as the voltages of phases 3.

The power negative sequence system likewise has three vectors with the same amplitude that are referred to below as A', B' and C'. Vectors A', B', C' also have a 120° phase offset in electrical terms relative to each other. They rotate in the same direction as vectors A, B and C of the power positive sequence system. The sequence of vectors A', B' and C' of the power negative sequence system is, though, reversed relative to vectors A, B and C of the power positive sequence system. The sequence is therefore C', B', A'.

The power zero sequence system also has three vectors with the same amplitude that are referred to below as A", B" and C". The phase offset of vectors A", B" and C" relative to each other is zero. Vectors A", B" and C" therefore rotate in phase. They rotate in the same direction as vectors A, B, C of the power positive sequence system.

The currents described by vectors A, A' and A" flow in one of the phases 3 of the power system 2. The currents B, B' and B" flow in another of the phases 3 of the power system 2. The currents C, C' and C" flow in the third of the phases 3 of the power system 2.

The amplitudes of vectors A, B, C of the power positive sequence system, of vectors A', B', C' of the power negative sequence system, and of vectors A", B", C" of the power zero sequence system can be different. The phase angles of vector A in relation to vector A' and to vector A" can also be different from each other. Taken together, the power positive sequence system, the power negative sequence system and the power zero sequence system define the currents flowing in the phases 3 of the power system 2.

In the case of the embodiment shown in FIG. 2, the (common) star point 15 of the zigzag winding 14 can be grounded. In the case of the embodiment shown in FIG. 3, one of the two star points 15, 16 of power transformer 4 and zigzag transformer 14 can be grounded. It is alternatively possible in the case of the embodiment shown in FIG. 3 for neither of the two star points 15, 16 of power transformer 4 and zigzag transformer 14 to be grounded. Both of the star points 15, 16 should not be grounded, however.

Figure 4:
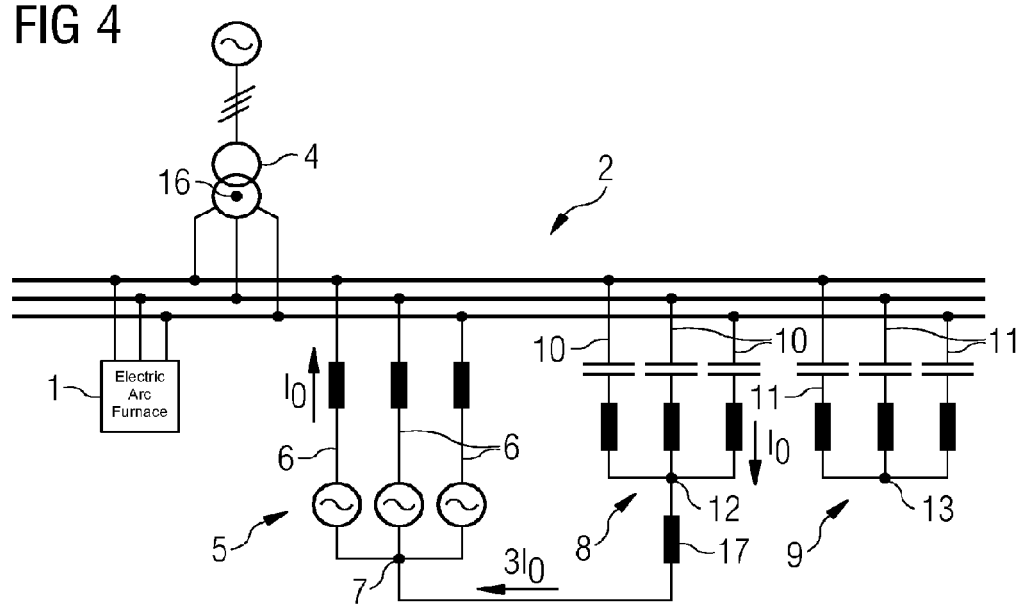
FIG. 4 shows another example embodiment of the power supply device of FIG. 1.

As an alternative to the presence of a zigzag winding (see the embodiments shown in FIGS. 2 and 3) it is possible according to FIG. 4 for the common star point 7 of the multilevel converter 5 to be connected to the star point 12, 13 of one of the filter circuits 8, 9. In the case of the embodiment shown in FIG. 4, the common star point 7 of the multilevel converter 5 is hence connected to the phases 3 of the power system 2 via the strands 6 of the multilevel converter 5 on the one hand and via the corresponding filter circuit 8 on the other hand.

Also in the case of the embodiment shown in FIG. 4, the connection via the corresponding filter circuit 8 is such that—referred to said connection—there is a low-resistance connection of the common star point 7 of the multilevel converter 5 to the phases 3 of the power system 2 with respect to the power zero sequence system of the power system 2 and a high-resistance connection with respect to the power positive sequence system of the power system 2 and to the power negative sequence system of the power system 2. For this purpose a choke 17 can be disposed for example as shown in FIG. 4 between the common star point 12 of the filter circuit 8 and the common star point 7 of the multilevel converter 5. The choke 17 can be dimensioned in particular such that the combined impedance of choke 17 and filter circuit 8 is zero.

Instead of the zigzag winding 14 and the filter circuit 8 it is alternatively also possible to use another device if it displays the following characteristics:

It is connected to the phases 3 of the power system 2.

It has a star point.

The star point of said device is connected to the common star point 7 of the multilevel converter 5.

The connection via said device is such that there is a low-resistance connection of the common star point 7 of the multilevel converter 5 to the phases 3 of the power system 2 with respect to the power zero sequence system of the power system 2.

The connection via the device is furthermore such that there is a high-resistance connection of the common star point 7 of the multilevel converter 5 to the phases 3 of the power system 2 with respect to the power positive sequence system of the power system 2 and to the power negative sequence system of the power system 2.

Certain embodiments may provide one or more advantages. For example in some embodiments the voltage loading of the multilevel converter 5 is lower by the factor 1.7320 than in the case of a delta connection. The disclosed power supply device can therefore be realized considerably more economically than a comparable conventional power supply device, with no loss of performance capability. Savings of between 20 and 40 percent are possible in the case of new installations in which the zigzag winding 14 can be installed in the power transformer 4 as a secondary winding. Savings are likewise possible, even if somewhat less, in the case of a retrofit.

The above description serves solely to explain the present invention. The scope of protection of the present invention, in contrast, shall be determined solely by the attached claims.

The invention claimed is:

1. A power supply device for a nonlinear, time-varying load, comprising:
    a power system having a plurality of phases,
    wherein the nonlinear, time-varying load and a reactive power compensator are connected to the phases of the power system,
    wherein the reactive power compensator is embodied as a multilevel converter having a plurality of strands,
    wherein each strand of the multilevel converter is connected to one of the phases of the power system and to the other strands at a common star point,
    a filter circuit configured to filter harmonics of load and converter currents,
    wherein the filter circuit has a plurality of strands, each strand being connected to one of the phases of the power system and to the other strands at a common star point of the filter circuit,
    wherein the common star point of the multilevel converter is connected to the common star point of the filter circuit such that the common star point of the multilevel converter is connected to the phases of the power system both via the strands of the multilevel converter and via the filter circuit, and
    wherein the connection via the filter circuit provides a low-resistance connection of the common star point of the multilevel converter to the phases of the power system with respect to the power zero sequence system of the power system and a high-resistance connection with respect to the power positive sequence system of the power system and to the power negative sequence system of the power system.

2. The power supply device of claim 1, comprising a choke arranged between the common star point of the filter circuit and the common star point of the multilevel converter.

3. The power supply device of claim 2, wherein the choke is dimensioned such that the combined impedance of choke and filter circuit is zero.

4. The power supply device of claim 1, wherein the power supply device has at least one further filter circuit configured to filter harmonics of load and converter currents.

5. The power supply device of claim 1, wherein the number of phases of the power system is three.

6. A power supply device for a nonlinear, time-varying load, the power supply device comprising:
    a power system having a plurality of phases,
    wherein the nonlinear, time-varying load and a reactive power compensator are connected to the phases of the power system,
    wherein the reactive power compensator is embodied as a multilevel converter having a plurality of strands,
    wherein the strands of the multilevel converter are connected on the one hand to one of the phases of the power system in each case and on the other hand to one another at a common star point,
    wherein the power supply device has a filter circuit via which harmonics of load and converter currents can be filtered,
    wherein the filter circuit has a plurality of strands,
    wherein each strand of the filter circuit is connected to one of the phases of the power system and to the other strands at a common star point of the filter circuit,
    wherein the common star point of the multilevel converter is connected to the star point of the filter circuit such that the common star point of the multilevel converter is connected to the phases of the power system both via the strands of the multilevel converter and via the filter circuit, and
    wherein the connection via the filter circuit provides a low-resistance connection of the common star point of the multilevel converter to the phases of the power system with respect to the power zero sequence system of the power system and a high-resistance connection of the common star point of the multilevel converter with respect to the power positive sequence system of the power system and the power negative sequence system of the power system.

7. The power supply device of claim 6, comprising a choke arranged between the common star point of the filter circuit and the common star point of the multilevel converter.

8. The power supply device of claim 7, wherein the choke is dimensioned such that the combined impedance of choke and filter circuit is zero.

9. The power supply device of claim 6, wherein the power supply device has at least one further filter circuit configured to filter harmonics of load and converter currents.

10. The power supply device of claim 6, wherein the number of phases of the power system is three.

* * * * *